United States Patent
Clauson et al.

(10) Patent No.: US 11,727,666 B2
(45) Date of Patent: Aug. 15, 2023

(54) AUTOMATIC TARGET SCORING MACHINE

(71) Applicants: Paul Clauson, Atherton, CA (US); Matthew Newell, Reno, NV (US); Max Lee, Bountiful, UT (US); Teja Veeramacheneni, Fremont, CA (US)

(72) Inventors: Paul Clauson, Atherton, CA (US); Matthew Newell, Reno, NV (US); Max Lee, Bountiful, UT (US); Teja Veeramacheneni, Fremont, CA (US)

(*) Notice: Subject to any disclaimer, the term of this patent is extended or adjusted under 35 U.S.C. 154(b) by 0 days.

(21) Appl. No.: 16/948,233

(22) Filed: Sep. 9, 2020

(65) Prior Publication Data

US 2021/0133441 A1    May 6, 2021

Related U.S. Application Data

(60) Provisional application No. 62/899,519, filed on Sep. 12, 2019.

(51) Int. Cl.
*G06V 10/44*    (2022.01)
*G06V 20/00*    (2022.01)
*G06V 10/56*    (2022.01)
*G06V 10/764*    (2022.01)
*G06V 10/774*    (2022.01)
*G06V 10/82*    (2022.01)

(52) U.S. Cl.
CPC ............ *G06V 10/44* (2022.01); *G06V 10/56* (2022.01); *G06V 10/764* (2022.01); *G06V 10/774* (2022.01); *G06V 10/82* (2022.01); *G06V 20/00* (2022.01)

(58) Field of Classification Search
CPC ................................................ G06K 9/00624
See application file for complete search history.

(56) References Cited

U.S. PATENT DOCUMENTS

| | | | | |
|---|---|---|---|---|
| 6,058,208 A * | 5/2000 | Ikeda | | H04N 1/622 |
| | | | | 358/518 |
| 9,129,356 B2 * | 9/2015 | Dougal | | G06T 7/001 |
| 2005/0190965 A1 * | 9/2005 | Hwang | | G11B 27/28 |
| | | | | 382/165 |
| 2015/0036878 A1 * | 2/2015 | Nashizawa | | G06T 5/50 |
| | | | | 382/103 |
| 2017/0370683 A1 * | 12/2017 | Ghani | | A63F 13/837 |
| 2019/0186876 A1 * | 6/2019 | Howe | | G09B 5/02 |

* cited by examiner

*Primary Examiner* — Pinalben Patel
(74) *Attorney, Agent, or Firm* — Forsgren Fisher; Daniel A. Tysver; James M. Urzedowski

(57) ABSTRACT

A image of a target is obtained and processed to find changes in the target which represent projectiles hitting the target, and that target is then scored.

20 Claims, 17 Drawing Sheets

AUTOMATIC TARGET SCORING MACHINE

This application claims priority to Provisional application No. 62/899,519, filed Sep. 12, 2019, the entire contents of which are herewith incorporated by reference.

BACKGROUND

Target shooting is typically done by shooting with a projectile firing item, such as a gun, at paper targets. The locations where the projectile hits the target can be seen by the user in different ways. The location can be found using magnifying devices such as binoculars. Sometimes the targets are on pulleys and can be rolled back towards the shooter.

Users who target shoot want to get ready confirmation of the location where the target was hit.

SUMMARY

The inventors recognized the desirability of an indoor architecture for a shooting target system that automatically identifies the location of shots on a target. The system allows the shooters to know their score by looking at their phone or tablet, without needing to view the target. This can be used when competing with other shooters.

The system as described can be used with any existing indoor target range systems, as it is independent of target size and color.

Embodiments describe a system that uses an image acquisition device such as a camera to obtain images of the shooting target and uses a processing device to compute the location of the shots on the target. In embodiments, the users can share both the real-time and historic details as part of a competition. Unlike other systems, users who are competing need not be in the same physical location.

BRIEF DESCRIPTION OF THE DRAWINGS in the drawings:

the drawings show embodiments of the invention, and specifically

DETAILED DESCRIPTION

An embodiment is described herein with reference to the figures.

Figure 1:
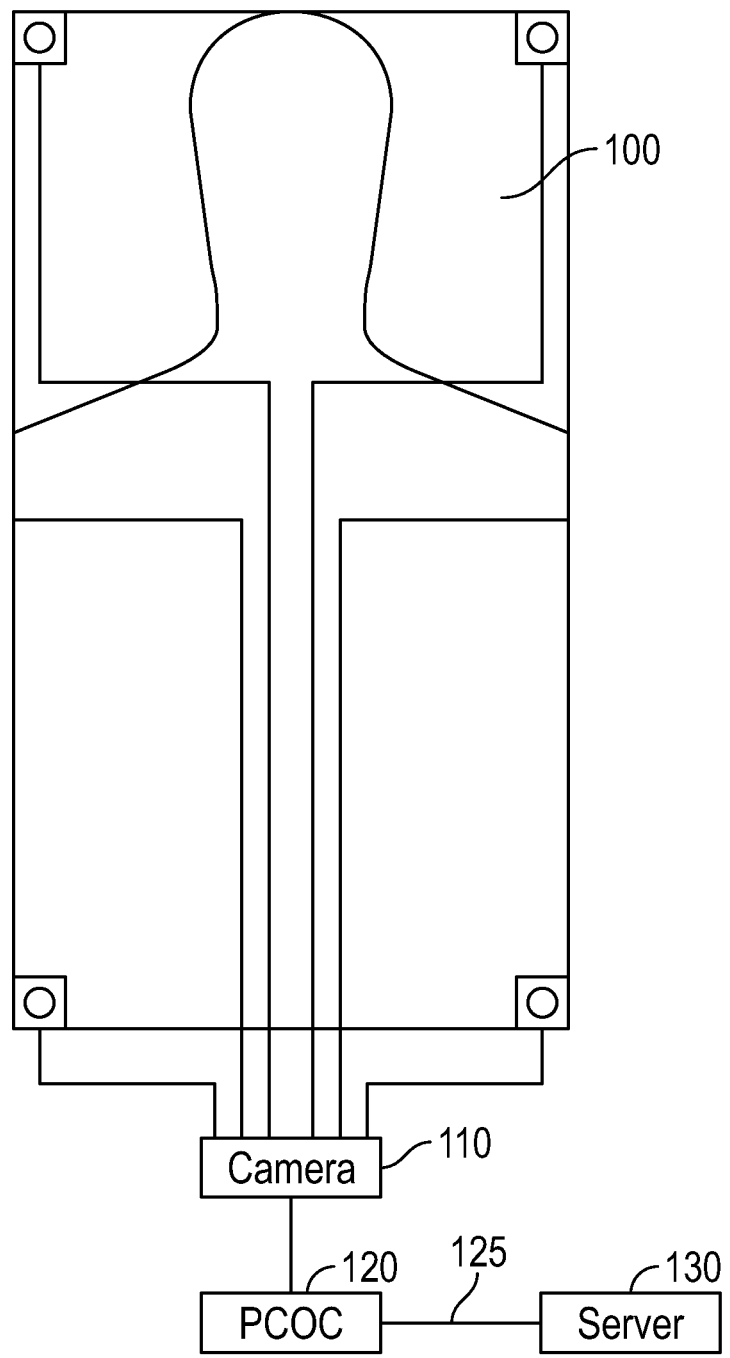
FIG. 1 shows a block diagram of the camera recognizing parts of the target.
Figure 3:
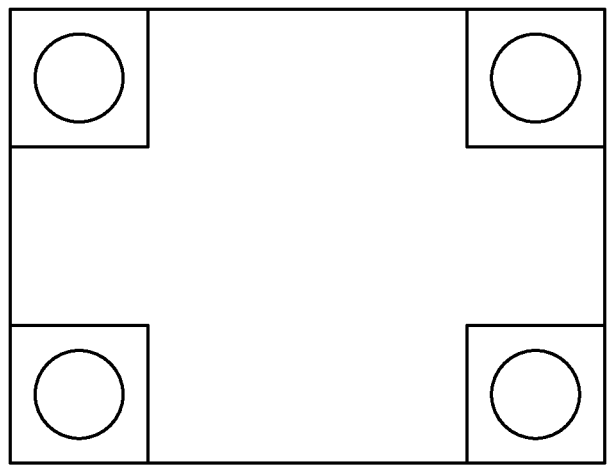
FIG. 3 illustrates exemplary datum in an embodiment.

FIG. 1 illustrates a basic silhouette target with datums on the target. The target can be any kind of target. The datums are unique identifiers which can be any form, but which can be recognized by a camera. In this embodiment, the datums are shown in FIG. 3, formed by squares having a hollow round centers at each of 4 corners of the target. By using these kinds of datum, the processing system can readily recognize the perimeter of the target.

Figure 10:
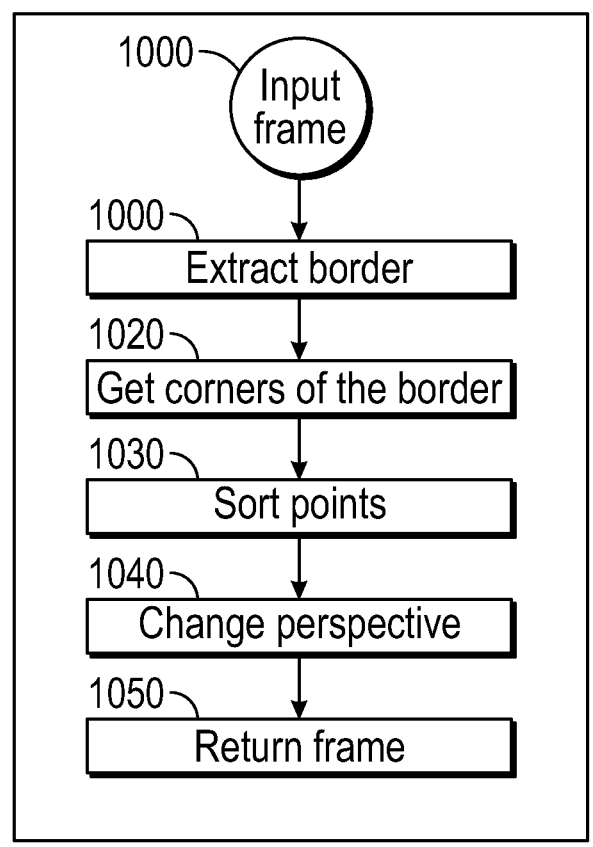
FIG. 10 shows an alternative flowchart of registration without using the datum references.

In an alternate embodiment, the processing system extracts the white border of any target without the datums to recognize the perimeter of the target. FIG. 10 illustrates this alternative embodiment, and is described herein.

Before the shooter starts shooting, the camera 110 and processor may identify the optimal digit and optical zoom values.

The camera 110 images the target at all times. Each time a projectile marks the target, the camera sends a labeled version of the target showing the locations of shots fired, to the user's device shown in FIG. 2. In this way, the user receives on their personal device an image of the target with the different shots thereon, also showing the total score of their shots.

In one embodiment, the datum that is used can be the one shown in FIG. 3, however any unique pattern can be used in this way. The image from the camera 110 is sent to a processor 120, which can be either the processor in an off site processing system, or can be processed by the smart phone.

The processor is connected to the Internet shown as 125 so that the results can be communicated with the Internet in real time. A central server can 130 can accumulate all of the information.

The processor 120 uses a processing system to determine images of the reason which are shot in order to score the image.

Figure 4:
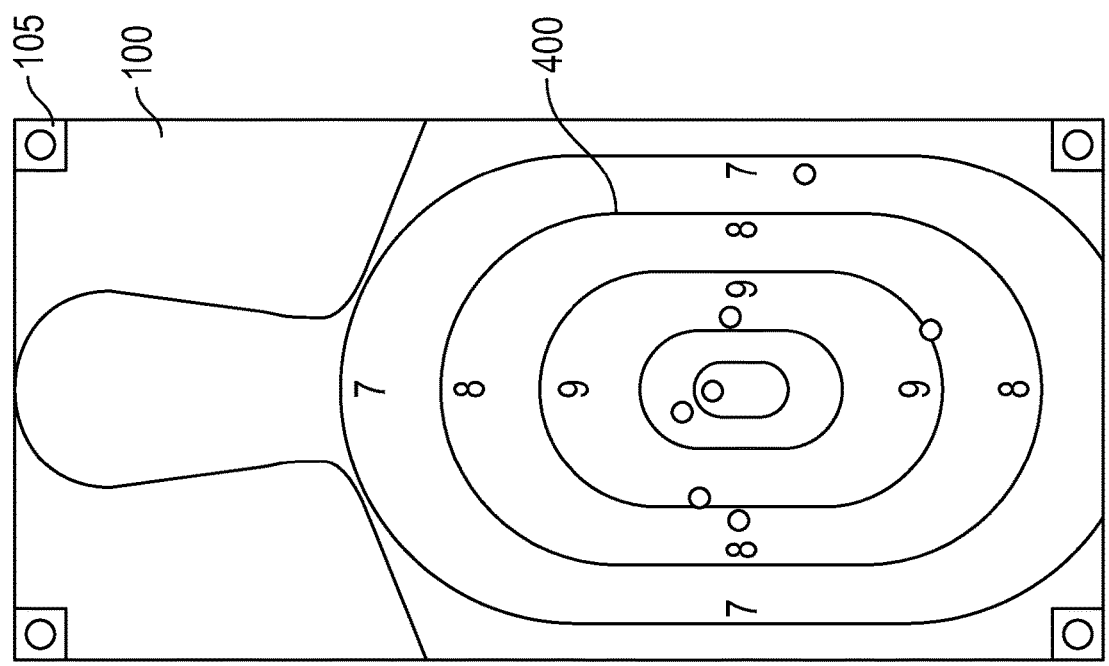
FIG. 4 shows the datum on a target.

The processor 120 can carry out the following steps. First, the system takes the target as shown in FIG. 1, after it has been shot at by a user. The target itself may have score lines 400, such as shown in FIG. 4 so that the target 100 not only includes the datum 105, but also score lines 400 which indicate the score which should be received for each shot.

Figure 5:
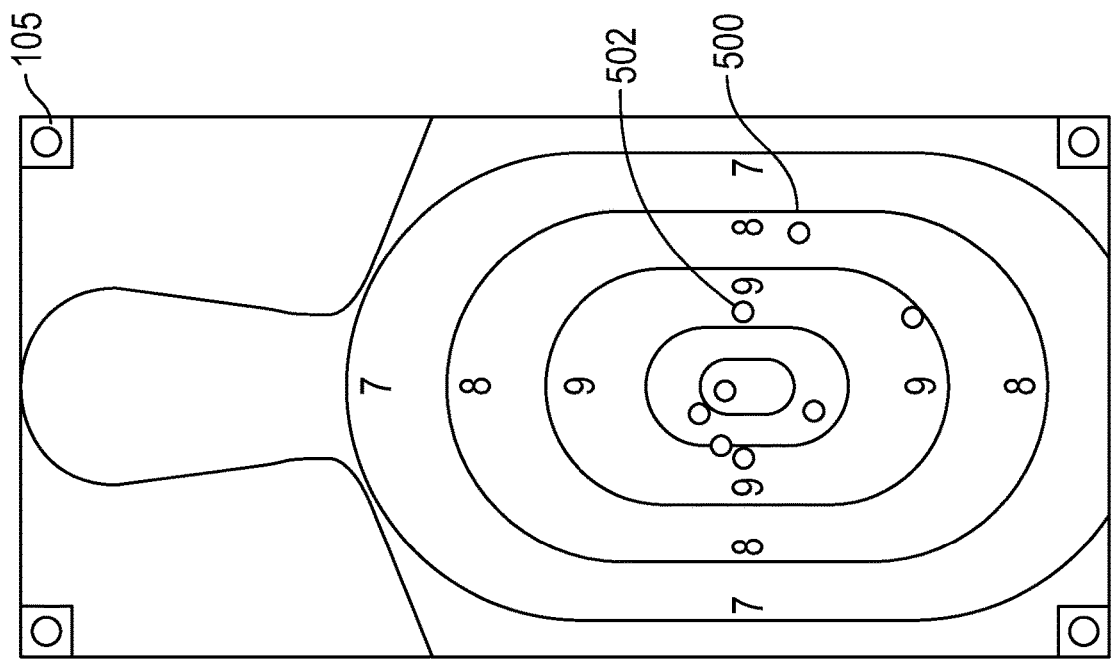
FIG. 5 shows identified shots on a target.

The processor transforms the image of the target to a common reference frame, thus transforming the input image into that standardized reference frame. FIG. 5 represents the target in the standardized reference frame, showing the processed target relative to the datum 105, and showing a number of different shots such as 500, 502 on the target. In this image, each of the shots is identified by machine vision, and also numbered. The numbering can be carried out sequentially, so that each shot gets a number, and each time a new shot is recognized using machine vision techniques, that new shot gets a new sequential number. For example, each image and each time can be correlated against a previous image, and when a difference is detected, that difference is compared against different images of what a shot through a paper target looks like. If the difference matches the shot, then the new item is recognized as a new shot and numbered.

Figure 6:
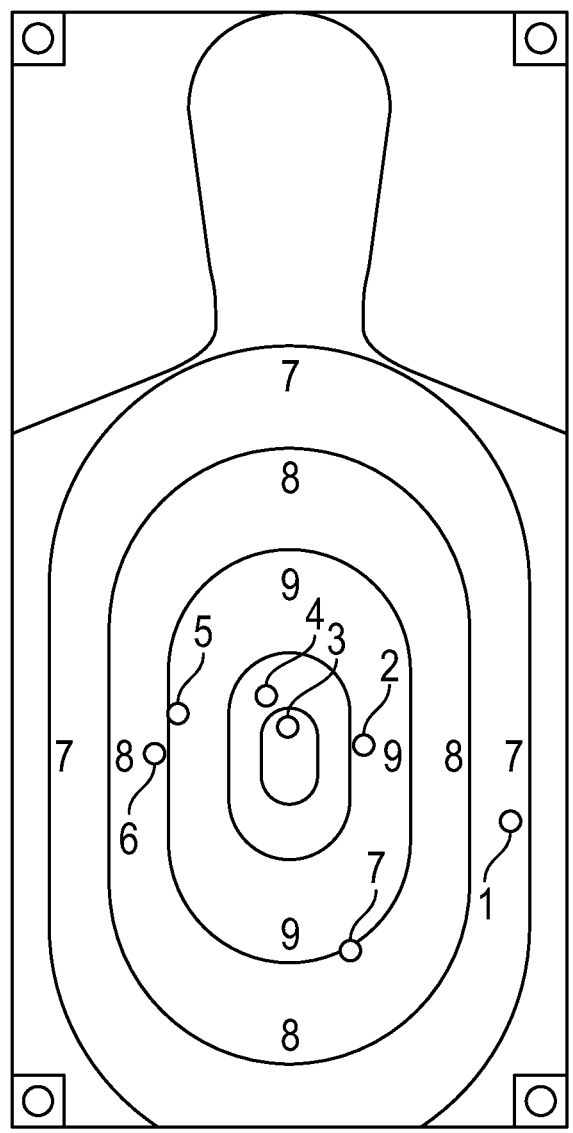
FIG. 6 shows additional identified shots on the target.

For each of the numbered target shots, as shown in FIG. 6, the system has identified all of: the location of the shot, the number of the shot, and the score associated with the shot.

Figure 2:
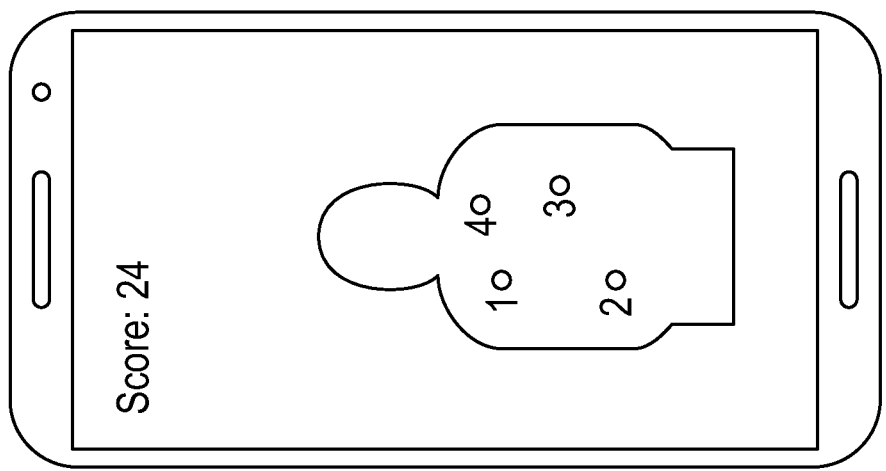
FIG. 2 illustrates a screen shown on a user's personal device.

A simplified version of the annotated target image is sent to the user's phone, as FIG. 2, which shows four numbered target hits ("shots"), and shows the score associated with those four numbered shots.

This uses a non-rigid transformation to align the target which is in an indeterminate reference frame based on the location of the camera, to the common reference frame, the common reference frame being defined by specific location of the datum.

In an embodiment where no specific datum is being used, the common reference frame is defined by the specific location of the machine identified perimeter of the target.

Then, the target image is processed by a technique which is agnostic to target color to distinguish the shots on the target, as described herein. False positives are removed by removing any spots on the target which are less than a specified size or of the wrong shape.

Figure 7:
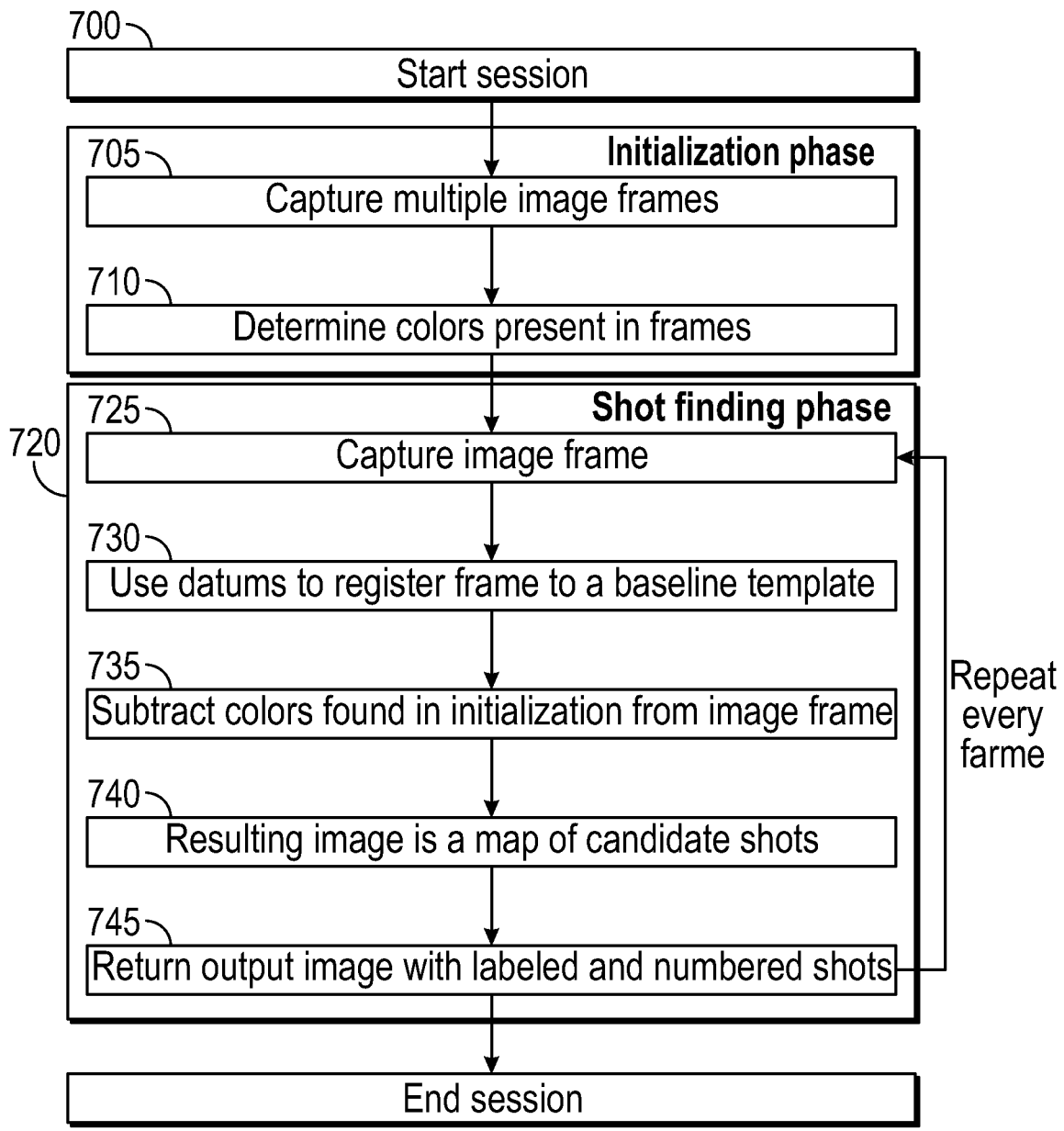
FIG. 7 shows a flowchart of operation to subtract colors.

An embodiment follows the flowchart of FIG. 7 to carry out all these items. The session is started at 700, which initially starts with an initialization phase at 705, in which multiple different image frames are captured of the target and its datum. At 710, the system determines different colors which are present in the frames. This is done in order to maintain the color agnostic features of the invention. Once the target has been specifically initialized, the flow of 720 is carried out at multiple different frames. At 725, an image frame is captured. At 730 the datums are used to register the frame to a baseline template.

Colors are initially found during the initial initialization at 710. These colors are then subtracted at 735 to form a color agnostic frame. The resulting image at 740 is a map of "candidate" shots, which are items which are likely to represent shots. This is then processed to remove false positives. For example, as described above, anything that is not the right size and/or shape to be properly classified as a target hit can be removed. Moreover, anything that is not visible for more than a specified time, such as 2 seconds, is similarly removed.

The output image of FIG. 2 is returned at 745 with labeled and numbered shots.

FIG. 8 shows additional details of the process as described previously herein. The initial sampling at is carried out at 800 by capturing a camera image at 805, registering the image at 806, sampling all the color pixels in the image at 807, and running this through a quantization algorithm at 808. An example quantization algorithm is the K-means-like algorithm, although other techniques are also possible. These colors are added to the pallet of existing colors at 809.

At the same time as the quantization, the system normalizes and formats the frame data at 810 and retains averages of frame normalization at step 811. After initializing, control passes, at 812, to the active processing carried out at 815. The active processing again receives a camera image 820. Image registration is carried out at 821, followed by eliminating the known pixels at 822 from the pallet. The remainder is converted to binary at 823, and dilated at 824. A time map is used at 825, to repeatedly increment and decrement each location at 826 and 827. This is used to find newly aged candidates at 828. Any newly aged candidate is taken as a new possible shot. At 829, it is determined whether this matches in time with a known shot. Machine learning techniques are utilized to confirm that a candidate shot is, in fact, a shot and distinguishes between nearby shots. Machine learning techniques are also used to determine if an area contains multiple shots that have merged together. If so, its location is extracted at 830, and again it is determined if this was a shot at 831. If so, the shot is scored at 832, and the local data structures are updated at 833 with the new scoring.

Figure 11:
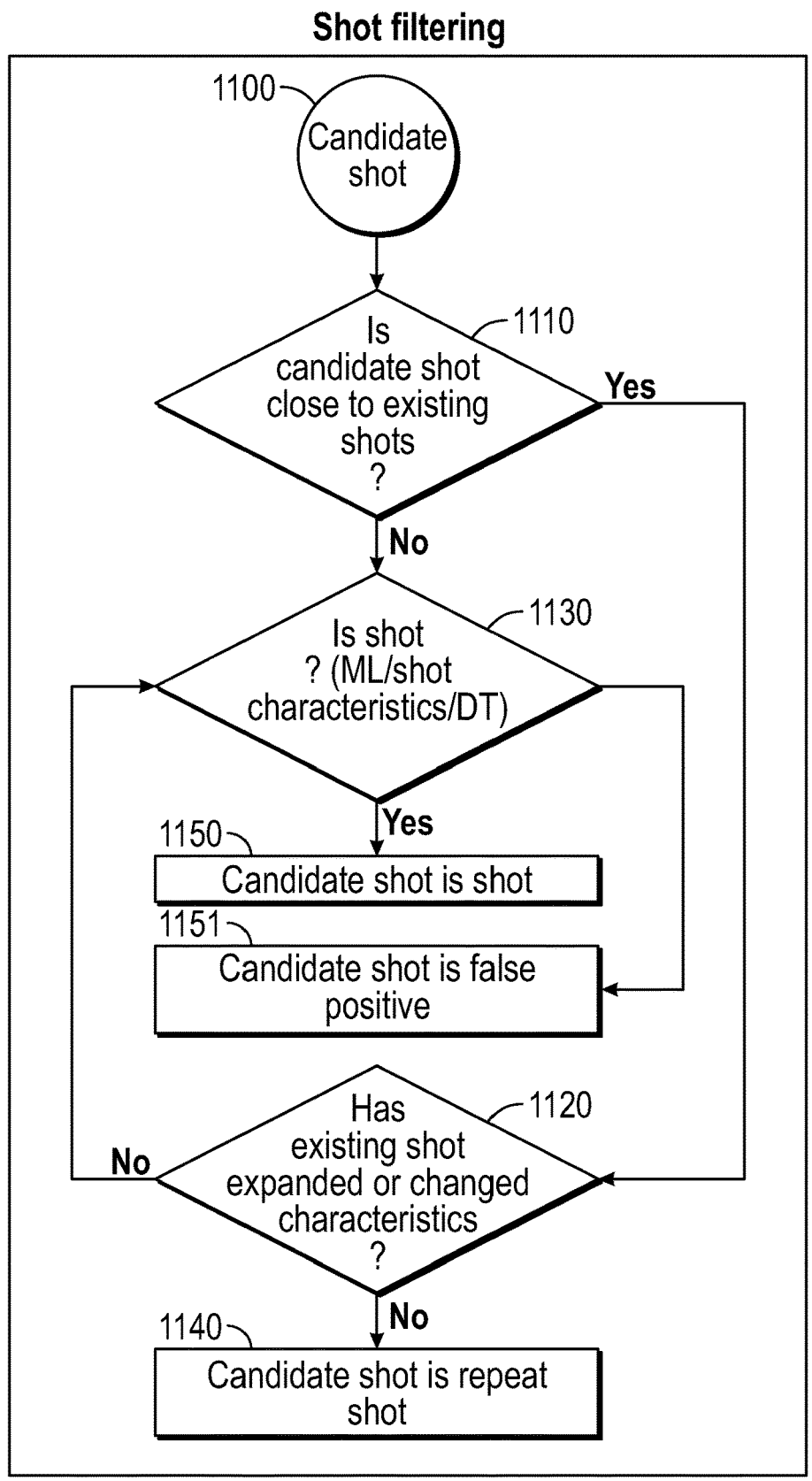
FIG. 11 shows a flowchart of shot filtering.

The determination of whether a shot has been fired at 831 is further explained herein with reference to FIG. 11.

At 1100, each candidate shot is processed. First, the system checks at 1110 if the shot is close to any other shots that we have already found, with a distance threshold. If it is close to any other shots, control passes to 1120 to determine if the area of the shot has expanded at 1120. If so, then this candidate shot is processed at 1130 to determine whether it is a new shot that is close to an existing shot. If not, this candidate shot is classified at 1140 as just a repeat of an old shot.

If the candidate shot is not closer to any other shots that we have found, 1130 is used to check if the candidate is a shot. This uses multiple different machine vision techniques as a quorum, including but not limited to utilizing machine learning techniques, candidate shot characteristics (such as circularity, dimensions, area, and arc length, latitude/longitudinal deltas), decision trees, and artificial neocortical neuron modelling utilizing sparsified network inputs. Each of these methods in tandem contribute to an overall confidence score as to whether the candidate is a shot or not.

Based on the confidence score, the candidate shot is characterized as a shot at 1150, or not as a shot at 1151.

Figure 9:
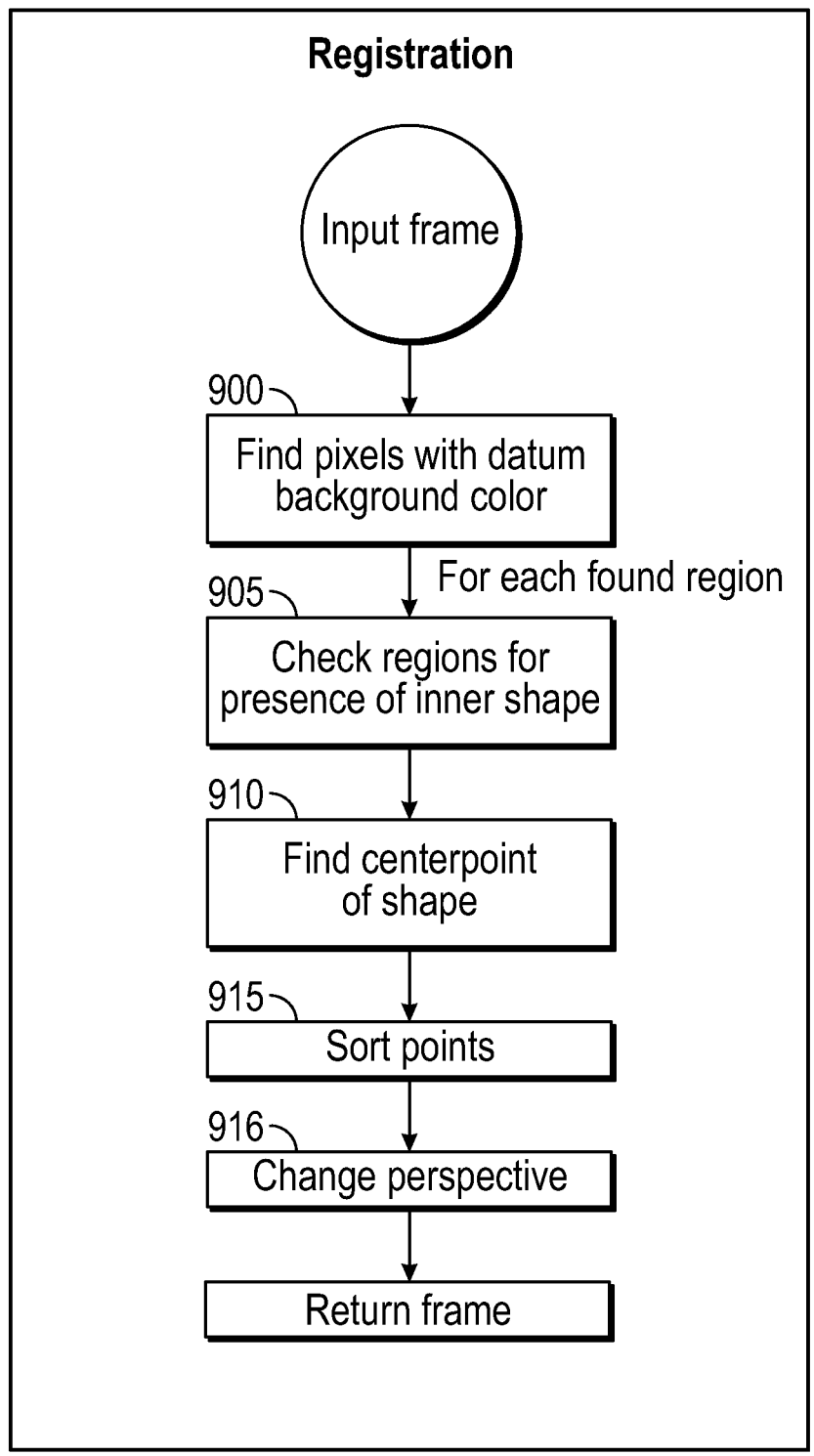
FIG. 9 shows a flowchart of registration.

The registration, shown in 806 is carried out as shown in FIG. 9. At 900, the pixels with the datum color are found. For each found region, the regions are checked for presence of an inner shape at 905. This inner shape should be roughly the size and shape of the projectile whose shot is being scored. The center point of the shape is found at 910. The points are sorted at 915 and their perspective is translated at 916 based on the datums. This provides the shot at FIG. 5.

Figure 8A:
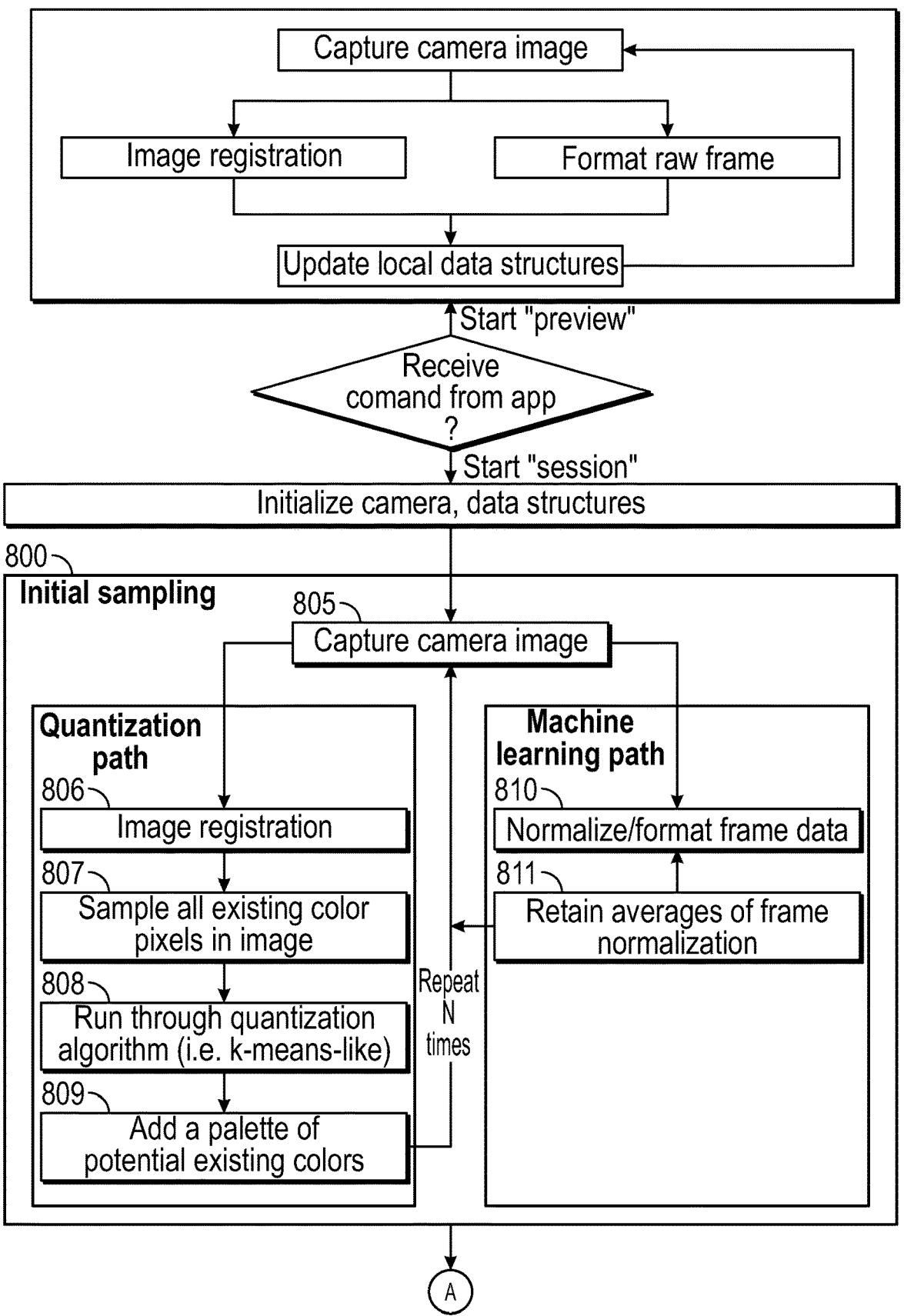
FIG. 8 shows a functional operation chart.
FIG. 8B shows a flow of the quantization path.
FIG. 8C shows the optical detection path
FIG. 8D represents the flow of the native bayes processing
FIG. 8E represents the spiking neural network
FIG. 8F represents hardcoded feature detection
FIG. 8G shows the hierarchical temporal method or HDM
FIG. 8H represents the object detection path
Figure 8A:
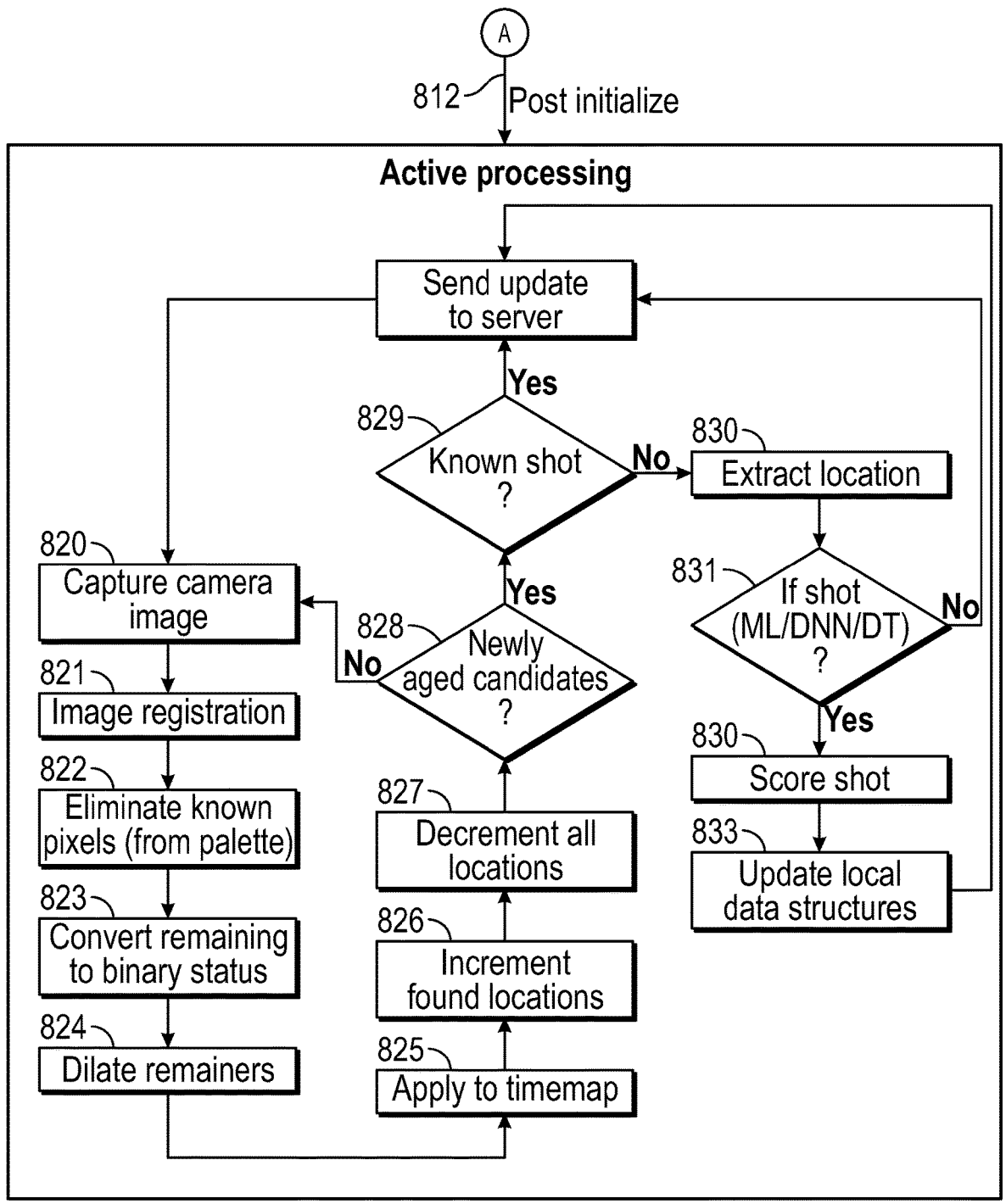
Figure 8B:
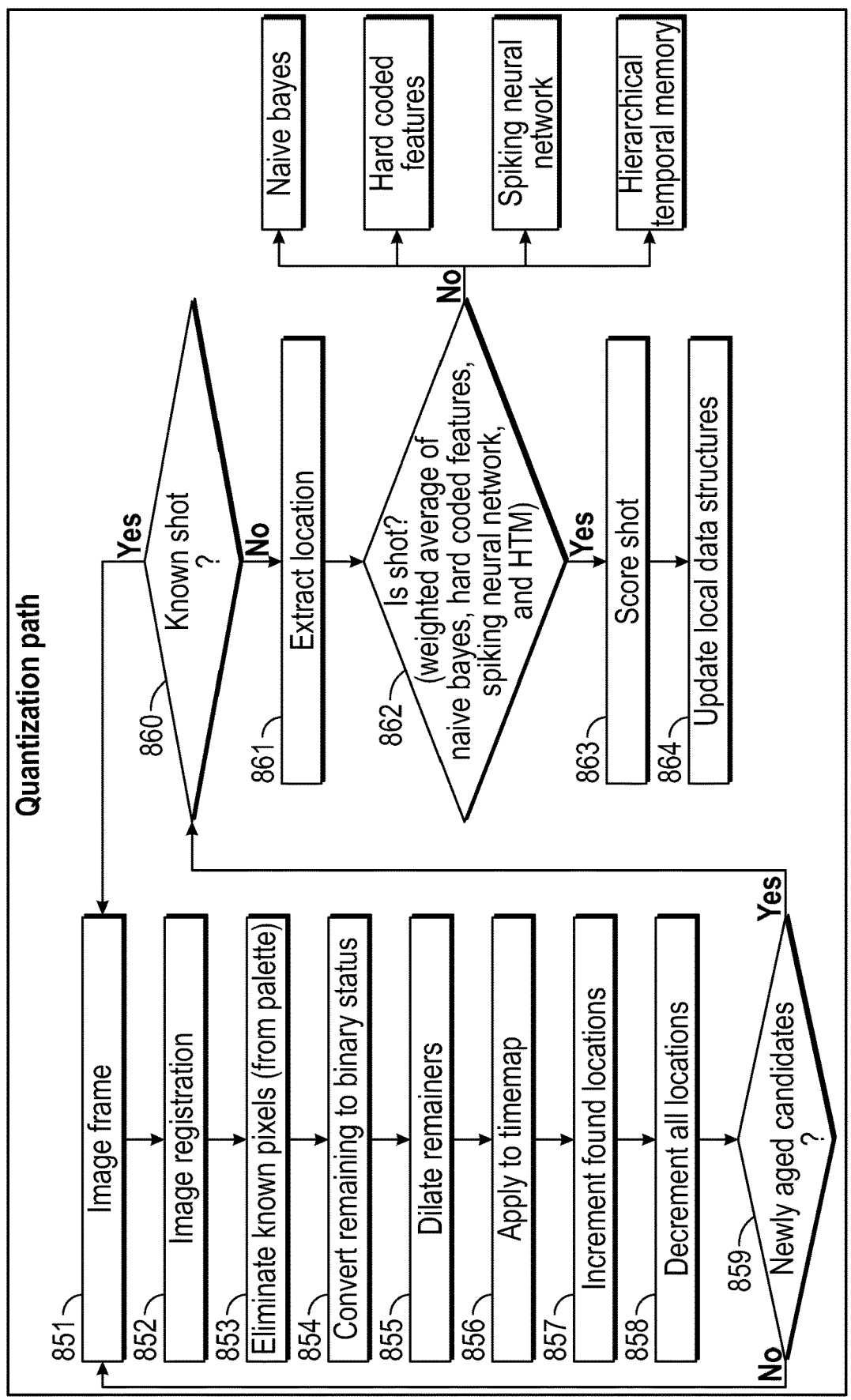

FIG. 8B shows an flow of the quantization path. The image frame is received at 851, and registered at 852 using the techniques described above. At 853, the known pixels are eliminated and the remaining pixels are converted to binary at 854. The remainders are then dilated, at 855, and applied to a time map at 856. The found locations are incremented at 857 and then decremented at 858. If there are any newly aged candidates at 859, 860 determines whether this is a known shot. If there are not newly aged candidates at 859, then flow returns to 851 to look for another image frame. A known shot is again returned to find the image frame. If there is no known shot at 860, however, the location of the shot is extracted at 861, and processed at 862 to determine if it is a shot using a weighted average of naïve Bayes, hard coding features, spiking neural network, and hierarchical temporary memory temporal memory. If this scores it yes, 863 scores this is a shot at 863 and updates the little data structures at 864.

Figure 8C:
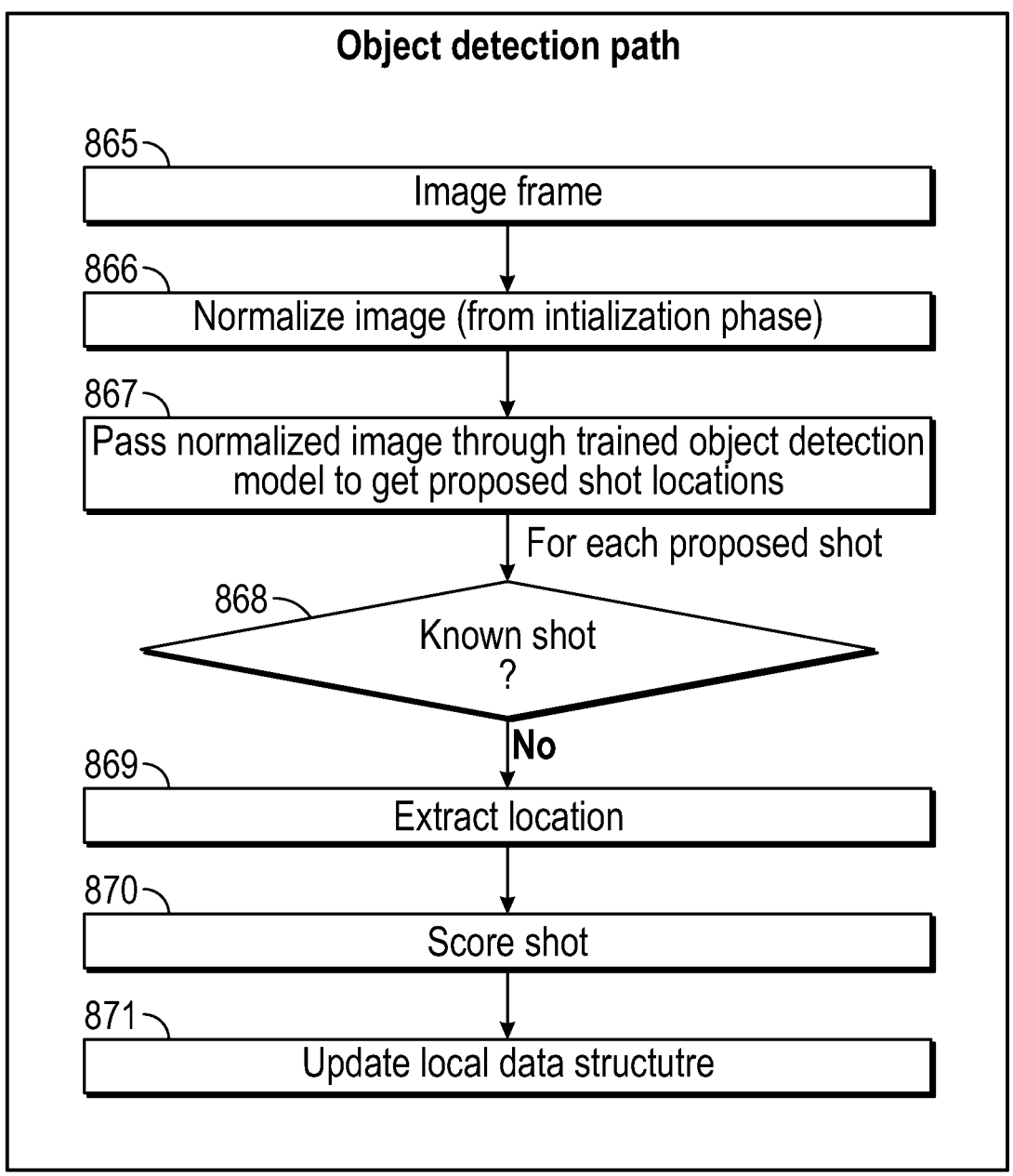

FIG. 8C shows the optical detection path. The image frame at 865 is normalized at 866 and the normalized images passed through trained object detection model at 867. 868 determines if this is a known shot, and if not extracts the location at 869. The shot escorted 870 and the data structures are updated at 871.

Figure 8D:
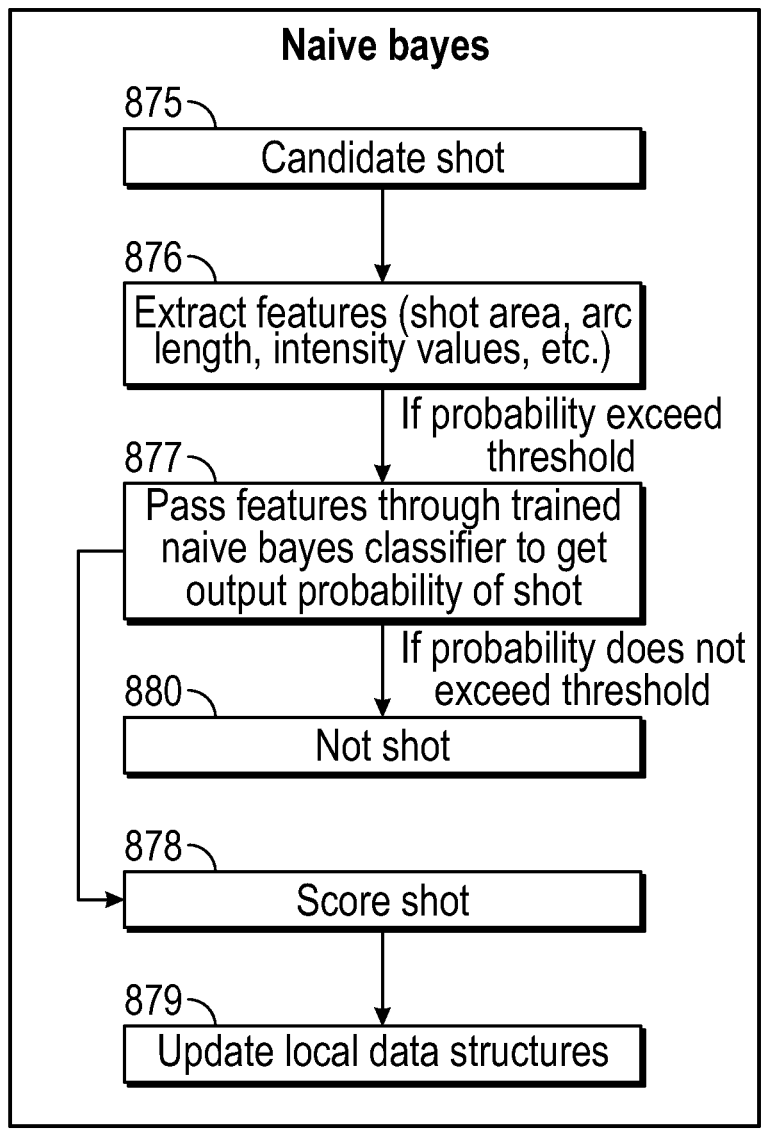

FIG. 8D represents the flow of the native bayes processing. The candidate shot at 875 has its features extracted at 876. If the probability exceeds the threshold, then the features are passed through a filter to get the probability of a shot at 877. If the probability exceeds the threshold at 877, the shot is scored at 878 and the data structures are updated at 879. Otherwise, the system is labeled as not being a shot at 880.

Figure 8E:
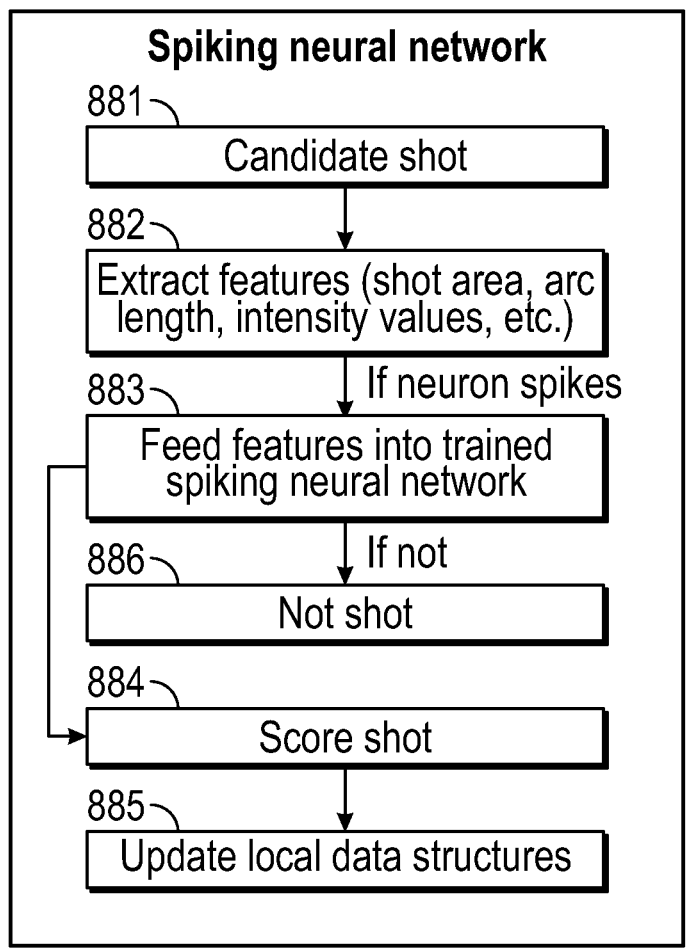

FIG. 8E represents the spiking neural network. The candidate shot at 881 has its features extracted at 882 and its features are fed into the trained spiking neural network at 883. If the neuron spikes at 883, this shot is scored at 884 and the data structures are updated at 885. If not, this is not a shot at 886.

Figure 8F:
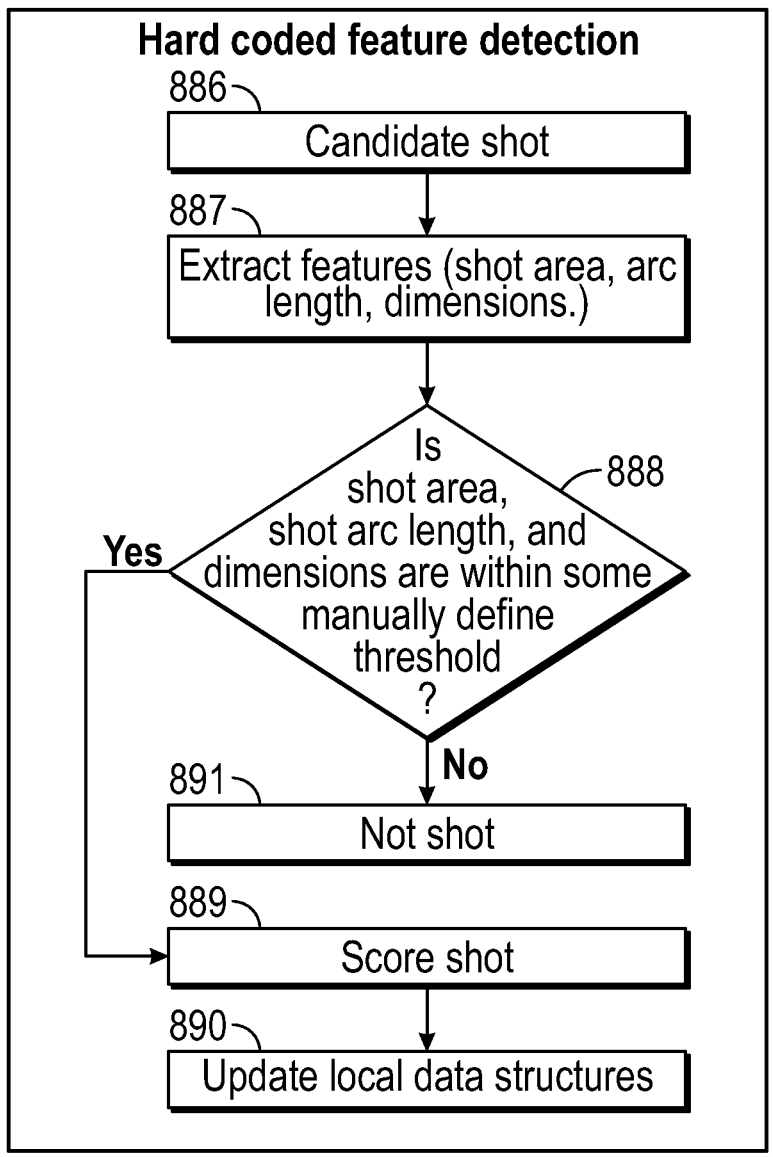
Figure 8G:
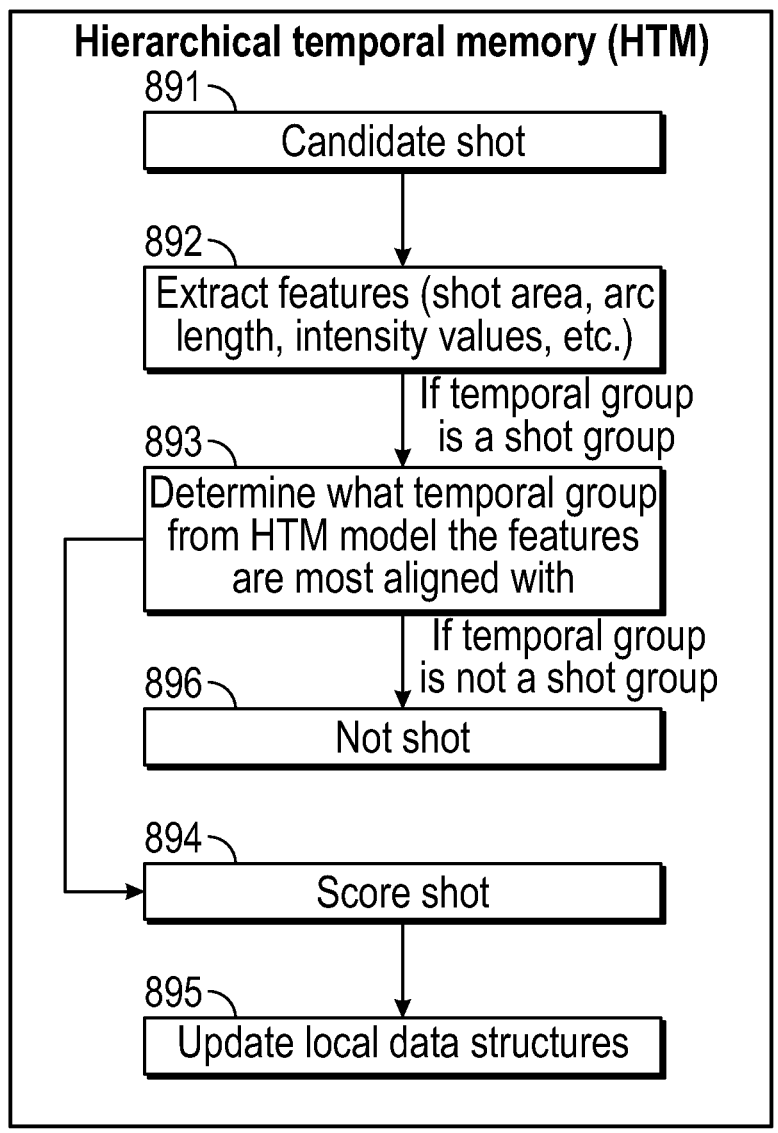

FIG. 8F represents hardcoded feature detection. This candidate shot at 886 has its features extracted at 887. 888 determines whether the shot area arc length and dimensions are within some threshold. If so, this shot is scored at 889 and the data structures are updated at 890. If not, then this is not a shot as determined at 891. The hierarchical temporal method or HDM is shown in FIG. 8G.

At 891 the candidate shot is received, and its features are extracted at 892 including the shot area arc length intensity values. 893 makes a determination of what temporal group from the HTN model, the features are aligned with. If these are aligned with a shot group at 893, the shot is scored at 894 and the data structures are updated at 895. If not, then this is taken as not being a shot at 896.

Figure 8H:
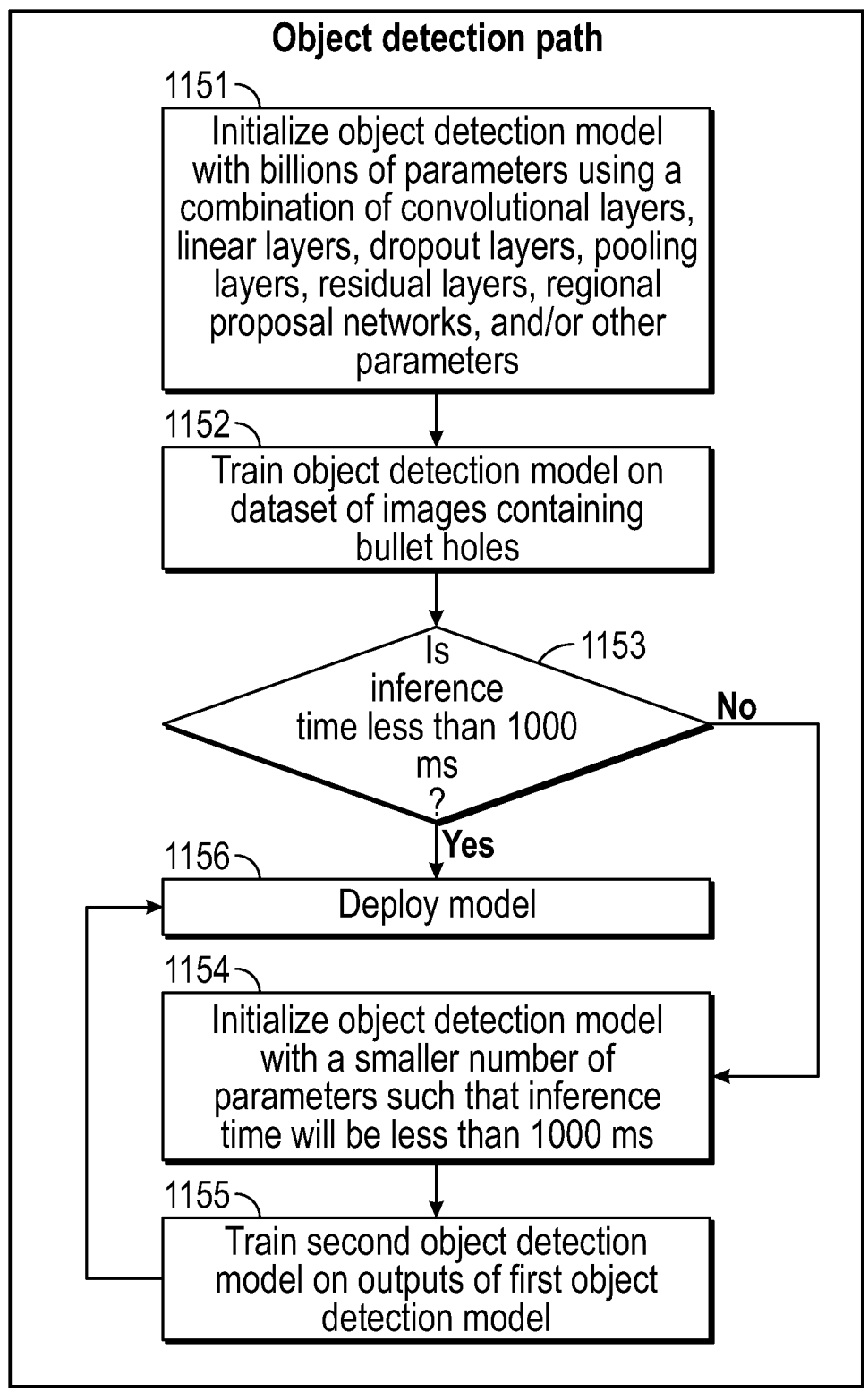

FIG. 8H represents the object detection path. At 1151, this operates to initialize the object detection module using a number of different layers and parameters. 1152 these object detection models are trained on data sets of images containing bullet holes. 1153 determines if the inference time is less than 100 ms, and if so, 1154 initiates initializes the object detection model with a smaller number of parameters so that the inference time will be less than a thousand milliseconds 1155 then trains the second object detection model on the outputs of the first object detection model. The model is deployed at 1156 in this way.

In addition to the technique described above to find shots, another technique that we have used to find shots is lightweight object detection models that can determine the location of shots on an image between 10 ms and 1000 ms. These lightweight object detection models are neural networks that utilize millions of parameters through convolutional layers, linear layers, dropout layers, pooling layers, residual layers, regional proposal networks, and/or other parameters. With this, they are able to identify and locate the shots on a given image fed into the network. These lightweight object detection models can be trained from scratch. They also can be trained using a technique called knowledge distillation, which is where the lightweight object detection model can be trained from the outputs of another machine learning model that is more accurate, but slower.

FIG. 10 illustrates an alternative embodiment, that allows the system to be used with any kind of target, without needing the datums on the target to identify and register the target.

In FIG. 10, a frame is input 1000, representing the information being imaged by the camera. At 1010, the border is extracted, and corners of the border obtained at 1020. These corners form the edges of the image. The different points in the image are sorted at 1030. The image is then changed in perspective to determine new points on the image, and the frame information is returned at 1050. By doing this, no datums are needed for the registration.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art.

What is claimed is:

1. A method of automated target shot identifying, comprising:
   receiving image frames of an area including a target having corners;
   registering the target by extracting the corners of the target from the image frames and using a non-rigid transformation to align the target to a reference frame;
   initializing the target by:
     i) identifying a plurality of colors found on the target in a first subset of the image frames, and
     ii) including the plurality of colors in a pallet of existing colors;
   identifying a potential shot in an analyzed frame by:
     i) subtracting all colors from the analyzed frame that are in the pallet of existing colors to form a color agnostic frame,
     ii) identifying a remainder in the color agnostic frame as the potential shot, and
     iii) ensuring that the potential shot remains in a later frame acquired at a specified later time;
   determining that the potential shot represents a target hit at a location where the target is changed by:
     i) comparing the potential shot to known shots to determine whether the potential shot is one of the known shots, and
     ii) when the potential shot is not a known shot, submitting a size and a shape for the potential shot for analysis to confirm the potential shot as the target hit at the location; and
   sending information indicative of the target hit to a user's personal device.

2. The method of claim 1, further comprising determining that a plurality of potential shots represents a plurality of target hits, and labelling the plurality of target hits with numerical values according to an order in which each target hit appeared on the target.

3. The method of claim 2, further comprising sending an image of the target along with information indicative of the plurality of target hits to the user's personal device as part of the information sent to the user's personal device, wherein the user's personal device presents the image of the target and locations of the plurality of target hits to a user.

4. The method of claim 3, further comprising sending a score for each of the plurality of target hits and a total score to the user's personal device as part of the information sent to the user's personal device.

5. The method of claim 1, wherein the analysis to confirm the potential shot as the target hit uses a machine vision technique to create a confidence score as to whether the potential shot is classified as the target hit, or not the target hit.

6. The method of claim 5, wherein the analysis to confirm the potential shot as the target hit uses a plurality of different machine vision techniques, wherein each technique contributes to a confidence score, and the confidence score is used to confirm the potential shot as the target hit at the location.

7. The method of claim 5, wherein the machine vision technique uses a trained, object detection model.

8. The method of claim 7, wherein the trained, object detection model is a neural network using convolutional layers, wherein the neural network is trained on images of containing holes in targets.

9. The method of claim 5, wherein the machine vision technique is a hardcoded feature detection algorithm that analyzes shot characteristics for the potential shot.

10. The method of claim 9, wherein the shot characteristics include arc length and dimensions of the potential shot.

11. The method of claim 1, wherein the corners are extracted by identifying specific datum found on the corners of the target.

12. The method of claim 1, wherein the plurality of colors on the target are identified using a k-means-like algorithm.

13. A system for automated target shot identifying, comprising:
   a) a target containing a plurality of colors and having corners;
   b) a camera that acquires image frames of an area including the target;
   c) a computer having a processor, the computer in communication with the camera to receive the image frames, the processor being programmed to:
      i) register the target by extracting the corners of the target from the image frames and using a non-rigid transformation to align the target to a reference frame;
      ii) initialize the target by:
         (1) identifying the plurality of colors found on the target in a first subset of the image frames, and
         (2) including the plurality of colors in a pallet of existing colors;
      iii) identify a potential shot in an analyzed frame by:
         (1) subtracting all colors from the analyzed frame that are in the pallet of existing colors to form a color agnostic frame, and
         (2) identifying a remainder in the color agnostic frame as the potential shotl;
      iv) determine that the potential shot represents a target hit at a location where the target is changed by:
         (1) comparing the potential shot to known shots to determine whether the potential shot is one of the known shots, and
         (2) when the potential shot is not a known shot, submitting a size and a shape for the potential shot for analysis to confirm the potential shot as the target hit at the location; and
      v) send information indicative of the target hit to a user's personal device.

14. The system of claim 13, wherein the analysis to confirm the potential shot as the target hit uses a machine vision technique to create a confidence score as to whether the potential shot is classified as the target hit, or not the target hit.

15. The system of claim 14, wherein the analysis to confirm the potential shot as the target hit uses a plurality of different machine vision techniques, wherein each technique contributes to a confidence score, and the confidence score is used to confirm the potential shot as the target hit at the location.

16. The system of claim 15, wherein the machine vision technique uses a trained, object detection model.

17. The system of claim 13, wherein the plurality of colors on the target are identified using a k-means-like algorithm.

18. A method of automated target shot identifying, comprising:
   a) receiving image frames of an area including a target;
   b) initializing the target by:
      i) identifying a plurality of colors found on the target in a first subset of the image frames, and
      ii) including the plurality of colors in a pallet of existing colors;
   c) identifying a potential shot in an analyzed frame by:
      i) subtracting all colors from the analyzed frame that are in the pallet of existing colors to form a color agnostic frame,
      ii) identifying a remainder in the color agnostic frame as the potential shot, and
      iii) ensuring that the potential shot remains in a later frame acquired at a specified later time;
   d) determining that the potential shot represents a target hit at a location where the target is changed by:
      i) determining a center of the potential shot and comparing the potential shot to known shots to determine whether the potential shot is one of the known shots, and
      ii) when the potential shot is not a known shot, submitting a size and a shape for the potential shot for analysis to confirm the potential shot as the target hit at the location; and
   e) sending information indicative of the target hit to a screen for display.

19. The method of claim 18, further comprising:
   i) determining that a plurality of potential shots represents a plurality of target hits, and labelling the plurality of target hits with numerical values according to an order in which each target hit appeared on the target,
   ii) determining a score for each of the plurality of target hits and a total score, and
   iii) sending to the screen an image of the target, locations for the plurality of target hits, the numerical values, and the total score.

20. The method of claim 18, wherein the plurality of colors on the target are identified using a k-means-like algorithm.

* * * * *